Patented July 14, 1942

2,289,919

UNITED STATES PATENT OFFICE 2,289,919

MANUFACTURE OF CATALYSTS

Edward C. Lee and Jacob Elston Ahlberg, Chicago, Ill., assignors to Universal Oil Products Company, Chicago, Ill., a corporation of Delaware No Drawing. Application October 31, 1938, Serial No. 238,075

7 Claims. (Cl. 252—250)

This invention relates particularly to the manufacture of catalysts suitable for accelerating reactions among hydrocarbons.

More specifically it has reference to a method for manufacturing refractory catalytic materials which are particularly effective in selectively promoting the formation of gasoline boiling range liquids from relatively heavy petroleum fractions.

The art of pyrolytically cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, it is largely empirical. A considerable number of the catalysts tried out in cracking have a tendency to accelerate reactions leading to the formation of gas rather than of gasoline, this being particularly evidenced by reduced metal catalysts, such as nickel or iron, and many of such catalysts are sensitive to sulfur poisoning and are quickly coated with carbonaceous materials which render them practically inert. This deposition of carbonaceous materials is frequently related to the type of decomposition reactions selectively fostered by the catalyst.

The present invention is concerned with the manufacture of catalytic materials which are specially adapted to accelerate the cracking of heavy fractions of petroleum and other hydrocarbonaceous materials to increase the rate of production of high antiknock gasoline boiling range fractions and gaseous by-products which contain unusually high percentages of readily polymerizable olefins which are a potential source of further gasoline yields. The preferred catalysts are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises the manufacture of catalysts suitable for use in hydrocarbon conversion reactions, more particularly the conversion of hydrocarbon fractions containing substantially no gasoline into substantial yields of gasoline of high antiknock value and gases containing relatively high percentages of readily polymerizable olefins by preparing in the primary step a precipitated hydrated silica gel, treating and washing said silica gel with a reactant and water to effect substantially complete removal of alkali metal ions, adding a precipitated zirconia to the purified precipitated silica, then drying the composite catalytic material to remove a major portion of the water content, forming into particles of definite size and calcining the purified catalytic material.

We have found that zirconia-silica catalysts which may be prepared by the several alternate methods described in more detail in the following paragraph, are rendered much more stable over long periods of use, and also more active and selective in accelerating gasoline forming reactions in cracking, when the originally precipitated hydrated silica which forms the primary material upon which the precipitated zirconia is subsequently disposed, is substantially freed from alkali metal ions which in the more general methods of preparation will be sodium ions inasmuch as the various sodium silicates comprise one of the more readily available raw materials for the manufacture of this type of catalyst. The purification treatment which constitutes one of the main features of our invention is described in detail in later paragraphs. The subsequent deposition of zirconia upon the purified precipitated silica gel may be varied somewhat and the following is a summary of the alternate modes of operation which may be employed.

1. The purified precipitated hydrated silica gel may be suspended in a solution of a zirconium salt and zirconia deposited upon the suspended silica by the addition of volatile basic precipitants, such as ammonium hydroxide, for example, or ammonium carbonate, ammonium hydrosulfide, ammonium sulfide, or other volatile basic precipitants generally may be employed.

2. The purified precipitated hydrated silica gel may be mixed while in the wet condition with a hydrated zirconia prepared, for example, by the addition of volatile basic precipitants to a zirconium salt solution where the precipitated zirconia may be also treated and washed by the methods hereinafter described for the purification of the precipitated silica gel.

3. The purified precipitated silica gel may be added to a solution of a zirconium salt and zirconia precipitated by hydrolysis, with or without heating, or the purified silica gel may be mixed with a suitable amount of a zirconium salt, for example, and heated whereby zirconia will be deposited as a result of the decomposition of the zirconium salt.

It can be seen from the above that various methods of admixing hydrated silica and hydrated zirconia substantially free from alkali metal ions may be employed within the scope of the present invention, although obviously the character and efficiency of the ultimately prepared zirconia-silica catalysts will vary more or less with the exact conditions of precipitation and/or mixing, purification treatment, and the ratio of zirconia to silica. For example, one preparation may furnish catalysts best suited for use in the cracking of heavy hydrocarbon fractions, another may be better adapted for use in reforming hydrocarbons substantially within the gasoline boiling point range, while still another preparation may be better adapted for other hydrocarbon reactions.

In the catalysts thus prepared the ratio of silica to zirconia by weight may range from 1 to 1 to 10 to 1 or greater ratios may be used, active catalysts having been prepared in which the ratio is as high as 50 to 1 so that in effect the zirconia may be considered to act as a promoter of the catalytic activity of the silica. It is to be recognized that very little is known positively concerning the mechanism of promoter action in catalysis and no attempt will be made herein to offer any definite reason for the observed effect of the addition of varying amounts of zirconia to silica. There may be a joint promoter effect or it may be that the zirconia is the more active catalyst and is extensively dispersed in and on the silica in order to present a large surface.

An important feature of our invention resides in the fact that catalysts of greatly increased stability and efficiency in cracking reactions are produced when there is substantially complete exclusion of alkali metal ions from the hydrated zirconia-silica masses prior to their drying and calcining to prepare them for service. In the present invention a precipitated hydrated silica gel substantially free from alkali metal ions is used as the primary material or base for the subsequent deposition of hydrated zirconia. Silica gel free from alkali metal ions may be prepared by the hydrolysis of silicon tetra-chloride, for example, but in the more usual method the hydrated silica gel will be prepared by the acidification of alkali metal silicates, whereby alkali metal ions are unavoidably incorporated into the silica gel which are removed as one feature in the process of our invention. It is not positively known whether the alkali metal compounds, such as those of sodium, are present in chemical combination or in an adsorbed state, but it has been definitely determined that their exclusion or removal is necessary if catalysts of superior activity and stability are to be obtained. It may be considered that the presence of these alkali metal ions may cause a sintering or fusion of the surfaces of the primary composites of the catalytic material at elevated temperatures so that the porosity of the catalyst particles is reduced or altered with a corresponding reduction in effective surface, considering the catalytic effects to be due at least in part to surface action. However, such concepts are principally speculative in view of the difficulty of obtaining direct confirmatory evidence.

Several alternative purification methods are applicable to primary hydrated silica gels prepared by the acidification of alkali metal silicate solutions to insure the substantially complete absence of sodium or other alkali metal ions. One method consists in treating and washing the precipitated silica gel with acidic solutions to extract alkali metal impurities incorporated into the silica gel during its preparation by the formation of corresponding alkali metal salts. Thus a precipitated silica gel may be first washed with water to remove a major portion of the soluble impurities and subsequently treated with a mineral acid, for example, such as hydrochloric acid and water to remove the alkali metal ions. As an alternative purification method the primary precipitated hydrated silica may be treated with ammonium compounds or salts, such as ammonium chloride in solution or other halides, the sulfate, the nitrate, or the acetate, so that alkali metal ions will not be substantially present in the primary gel when it has been suitably washed. Whether the alkali metal ions are present in the hydrated silica gel in a chemically combined or adsorbed condition, the alkali metal ions may be replaced by the ammonium ions which will be later expelled from combination or adsorption in subsequent treatment at elevated temperature.

Another alternate method for removing alkali metal ions from the precipitated hydrated silica gel consists in treating with salts of multivalent metals which may replace the sodium or other alkali metals in the manner similar to that described in the case of ammonium compounds. For example, a primary gel having large amounts of alkali metal compounds present may be treated with a solution of salts of multivalent metals, more particularly zirconium, in which the metal forms the positive ion of the salt being used. In this mode of operation the multivalent metal used to replace the alkali metal ions is introduced into the catalytic material and is not removed at elevated temperatures as is the ammonium above described. Whatsoever the purification method used, purified hydrated primary gels may be prepared by all the methods above described and substantially alkali metal-free zirconia has been added with further processing according to the present invention to form catalysts suitable for hydrocarbon reactions.

The weight of evidence at hand on the mechanism leading to the replacement of alkali metals in the primary hydrated gel indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from the base exchange that occurs in the case of zeolites.

After the zirconia has been mixed or deposited upon the purified hydrated silica gel and water washed, if desired, it may be recovered as a filter cake and dried at a temperature of the order of 240–300° F., more or less, after which it may be pressed and sized to recover particles of a convenient average size or formed into desired shapes by compression methods. It has been found that after the usual drying treatment the material ordinarily has a total water content of approximately 15 per cent which appears to correspond to the best workability of the material. By calcining the particles at temperatures of the order of 850–1000° F. or higher, maximum activity of the catalyst is obtained and a further dehydration occurs so that, for example, after a period of heating at 900° F. the water content as determined by analysis is of the order of 2 to 3 percent which does not vary appreciably either as the result of long service or a large number of reactivations at considerably higher temperature.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous material at temperatures as high as 1400 to 1600° F. without material loss of catalytic activity.

According to the present process catalysts prepared by the general procedure described in the preceding paragraphs are utilized to advantage in cracking reactions when employed as filling material in tubes or chambers in the form of small pellets or granules. In the examples given below, wherein hydrocarbon fractions readily vaporizable at moderate temperatures without extensive decomposition are employed, the averabe particle size is within the range of 1 to 10 mesh, which may apply either to small pellets of uniform size and short cylindrical shape or to particles of irregular size and shape produced by the grinding and sizing of the partially dehydrated materials. In some types of operation, the catalyst may be formed into smaller particles powdered.

The general procedure in cracking involves contacting the heated hydrocarbonaceous material with the catalyst and the subsequent fractionation steps involving separation of residuum and the further splitting up of the products into fixed gases, fractions of gasoline boiling range and heavier recycle stocks, may obviously be followed in the case of the catalysts comprised within the scope of the invention. In using these catalysts moderate temperatures, relatively low pressures and high throughputs are to be expected in comparison with the strictly thermal cracking processes in use at the present time.

The following examples of preparation of the types of catalysts peculiar to the present invention are given to indicate their novelty and utility although not for the purpose of limiting the invention in exact agreement with the data introduced.

Example I

A catalyst prepared according to the present invention comprising 4 moles of zirconia deposited on 100 moles of hydrated silica was prepared according to the following general procedure:

A silica hydrogel precipitated from a sodium silicate solution was washed and treated with dilute acid and ammonium chloride solution to substantially remove alkali metal ions, and the purified hydrated silica was suspended in a solution of a zirconium salt and zirconia precipitated.

Eighteen liters of a commercial grade of sodium silicate was diluted with 50 gallons of distilled water and agitated, while dilute hydrochloric acid containing 6 liters of concentrated hydrochloric acid in 5 gallons of water was slowly added. When about 4 gallons of the acid had been added gel began to form. The gel was then broken up and agitated while adding half of the remaining acid, whereupon the viscosity was diminished to a pronounced degree and the remaining acid added. After standing for a while the precipitated gel was directed to a filter press and filtered. The filter cake was broken up and treated to remove sodium ions as follows: Five gallons of water containing added hydrochloric acid was first used for washing, whereupon the gel was filtered and subsequently washed twice with 10 gallon portions of water. Subsequently the material was treated with 10 gallons of water containing added hydrochloric acid and ammonium chloride after which a wash with 10 gallons of water was used. Thirteen hundred and fifty-six grams of this filtered gel corresponding to 3 moles of silica was slurried in 3½ liters of water and 170 cc. of a solution of $ZrOCl_2$ (corresponding to 0.12 mole $ZrO_2$) in excess hydrochloric acid added. After prolonged agitation of this suspension a solution of 52 cc. concentrated ammonium hydroxide in 1200 cc. of water was slowly added while agitating. The final liquid was alkaline to litmus. The precipitated mass was then filtered and further washed and a portion of the filter cake was dried at approximately 300° F., prepared into 6–10 mesh granules for a test, and subsequently calcined at approximately 932° F.

The following results were obtained when processing a 37 A. P. I. gravity gas-oil in a once-through operation:

Cracking data and results

| | Run 1 | Run 2 |
|---|---|---|
| Temperature, °F | 932 | 932 |
| Gasoline, 400° F. E. P.: | | |
| Volume percent | 25.3 | 23.0 |
| A. P. I. gravity, 60° F | 58.8 | 59.5 |
| Octane number (motor method) | 78.6 | 78.6 |
| Gases (boiling range below +10° C.): | | |
| Molecular weight | 36.5 | 33.7 |
| Propene and butenes— | | |
| Weight percent of charge | 3.9 | 3.6 |
| Gas-oil recovered (recycle stock): | | |
| Volume percent | 73.8 | 75.5 |
| A. P. I. gravity, 60° F | 37.5 | 37.5 |

Example II

In the following example a silica-zirconia catalyst was prepared containing 16 moles of $ZrO_2$ deposited upon 100 moles of $SiO_2$. The general method involved the purification of a silica gel with subsequent precipitation of zirconia in the presence of the suspended purified hydrogel.

A silica gel was prepared and purified as follows:

Eight hundred and thirty grams of a commercial waterglass was diluted using 6 liters of water. A liter of 2.5 molar hydrochloric acid was then slowly added to the sodium silicate solution while agitating. After the addition of all the acid the liquid was acidic to blue litmus. The mixture was filtered and the filter cake was washed several times using 5 liters of water for each washing. The precipitated gel was then washed with 5 liters of water containing ¼ equivalent of hydrochloric acid, which operation was performed twice. Subsequently the precipitated material was washed several times with 5 liter portions of water. Five hundred and thirty-seven grams of the hydrated silica, corresponding to 1.35 moles of $SiO_2$, was suspended in 750 cc. of water and a solution of 57.3 grams of zirconyl nitrate in 1000 cc. of water added. After prolonged agitation 757 cc. of 1.006 normal ammonium hydroxide was added while agitating so that the final liquid was basic to litmus. The precipitated material was dried at approximately 300° F. A portion of the dried material was pressed and granules of 6-10 mesh formed which were subsequently calcined at approximately 932° F.

Using granules of the above catalyst disposed in a catalyst chamber, a paraffinic gas-oil was vaporized and preheated to a temperature of 932° F. and passed through the granular catalyst bed at a liquid space velocity per hour of approximately 4. In a once-through operation there was produced 28.7% of 400° F. end-point gasoline having an octane number of 78.1. There was also produced 5.2% by weight of the original charge of readily polymerizable 3 and 4 carbon atom olefins.

*Example III*

The method used in this example is to prepare and purify a silica gel as in Example II above and then suspend in a solution of a zirconium salt, draining the precipitate and drying at approximately 300° F.

A purified precipitated hydrogel is prepared exactly as indicated in the above example and suspended in 500 cc. of a solution containing 50 grams of $ZrOCl_2$. After thorough agitation the excess liquid is drained off by filtration and the filter cake dried at approximately 300° F. The dried material is then pressed in a hydraulic press and particles of 6-10 mesh produced from the pressed material. The particles are then calcined at approximately 932° F. and subsequently disposed in a catalyst chamber for a test.

Using the same gas-oil as was used in Example II, a yield of 25% by volume of 400° F. end-point gasoline may be obtained in a single pass, the octane number being the same as above with a 4% yield of readily polymerizable 3 and 4 carbon atom olefins.

We claim as our invention:

1. A process for the manufacture of catalysts suitable for use in hydrocarbon conversion reactions, which comprises precipitating a silica hydrogel from a solution of an alkali metal silicate by the acidification thereof, freeing said hydrogel substantially completely of alkali metals, suspending the purified hydrogel in a solution of a zirconium salt and precipitating zirconia by means of a volatile basic precipitant, heating the precipitated material to remove a major portion of the water content, forming particles of definite size, and calcining above a temperature of about 800° F.

2. A process for the manufacture of catalysts suitable for use in hydrocarbon conversion reactions, which comprises precipitating a silica hydrogel from a solution of an alkali metal silicate by the acidification thereof, washing and treating said hydrogel with a sufficient quantity of an acidic solution and water to substantially completely remove all alkali metals therefrom, suspending the purified hydrogel in a solution of a zirconium salt and precipitating zirconia by means of a volatile basic precipitant, heating the precipitated material to remove a major portion of the water content, forming particles of definite size, and calcining above a temperature of about 800° F.

3. A process for the manufacture of catalysts suitable for use in hydrocarbon conversion reactions, which comprises precipitating a silica hydrogel from a solution of an alkali metal silicate by the acidification thereof, washing and treating said hydrogel with a sufficient quantity of a solution of an ammonium compound and water to substantially completely remove all alkali metals therefrom, suspending the purified hydrogel in a solution of a zirconium salt and precipitating zirconia by means of a volatile basic precipitant, heating the precipitated material to remove a major portion of the water content, forming particles of definite size, and calcining above a temperature of about 800° F.

4. A process for the manufacture of catalysts suitable for use in hydrocarbon conversion reactions, which comprises precipitating a silica hydrogel from a solution of an alkali metal silicate by the acidification thereof, washing and treating said hydrogel with a sufficient quantity of a solution of a salt of a multivalent metal and water to substantially completely remove all alkali metals therefrom, suspending the purified hydrogel in a solution of a zirconium salt and precipitating zirconia by means of a volatile basic precipitant, heating the precipitated material to remove a major portion of the water content, forming particles of definite size, and calcining above a temperature of about 800° F.

5. A process for the manufacture of catalysts which comprises precipitating a silica hydrogel from a solution of an alkali metal silicate, freeing the hydrogel substantially completely of alkali metal ions, suspending the thus purified silica hydrogel in a zirconium salt solution, adding a volatile basic precipitant to the suspension to deposit hydrated zirconia on the silica hydrogel, and calcining the resultant silica-zirconia mixture.

6. A process for the manufacture of catalysts which comprises precipitating a silica hydrogel from a solution of an alkali metal silicate, freeing the hydrogel substantially completely of alkali metal ions, suspending the thus purified silica hydrogel in a zirconium salt solution, adding a volatile basic precipitant to the suspension to deposit hydrated zirconia on the silica hydrogel, heating the resultant wet precipitate mixture sufficiently to remove the major portion of its water content, forming the partially dehydrated mixture into masses of predetermined size, and calcining said masses.

7. A process for the manufacture of catalysts which comprises suspending precipitated silica hydrogel in a zirconium salt solution, adding a volatile basic precipitant to the suspension to deposit hydrated zirconia on the silica hydrogel, and calcining the resultant silica-zirconia mixture.

EDWARD C. LEE.
JACOB ELSTON AHLBERG.